J. B. COLVIN.
STREET CAR FENDER.
APPLICATION FILED MAY 15, 1914.
1,137,699.
Patented Apr. 27, 1915.
2 SHEETS—SHEET 1.
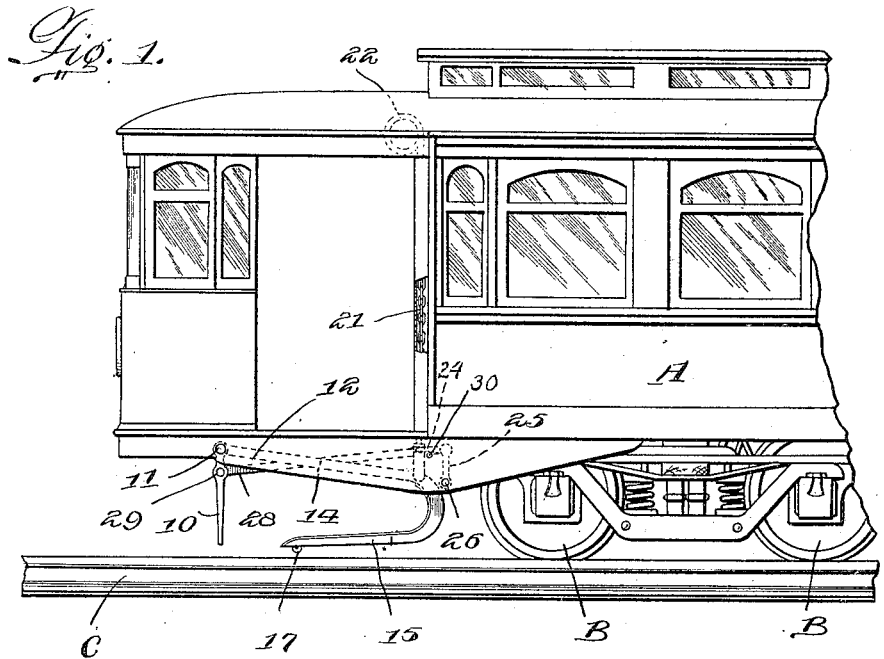
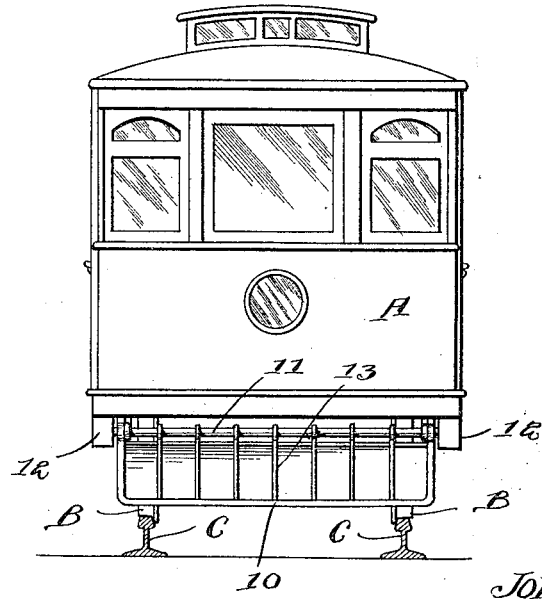
Witnesses
Frederick L. Foe,
Inventor
John B. Colvin
By Victor J. Evans.
Attorney

J. B. COLVIN.
STREET CAR FENDER.
APPLICATION FILED MAY 15, 1914.

1,137,699.

Patented Apr. 27, 1915.

2 SHEETS—SHEET 2.

Witnesses

Inventor
John B. Colvin.
By Victor J. Evans.
Attorney

UNITED STATES PATENT OFFICE.

JOHN B. COLVIN, OF DUNDEE, MISSISSIPPI.

STREET-CAR FENDER.

1,137,699.    Specification of Letters Patent.    Patented Apr. 27, 1915.

Application filed May 15, 1914. Serial No. 838,861.

*To all whom it may concern:*

Be it known that I, JOHN B. COLVIN, a citizen of the United States, residing at Dundee, in the county of Tunica and State of Mississippi, have invented new and useful Improvements in Street-Car Fenders, of which the following is a specification.

The invention relates to street car fenders, and more particularly to the class of automatically operated safety fenders for street railway cars.

The primary object of the invention is the provision of a fender of this character wherein on the striking of an obstruction in the line of travel of the car the fender will be automatically dropped to receive the obstruction, thereby preventing the car from passing over the same, thus obviating the possibility of a person falling beneath the wheels of the car when in front of the same and being struck by the car.

Another object of the invention is the provision of a fender of this character which is normally set so as to automatically operate should it strike an obstruction so as to receive the same and prevent the passing of the car thereover, the fender being of novel form to insure accuracy and positiveness in its operation.

A further object of the invention is the provision of a fender of this character which is extremely simple in construction, reliable and efficient in operation, and inexpensive in manufacture and installation.

With these and other objects in view, the invention consists in the construction, combination and arrangement of parts as will be hereinafter fully described, illustrated in the accompanying drawings, and pointed out in the claims hereunto appended.

Figure 3:
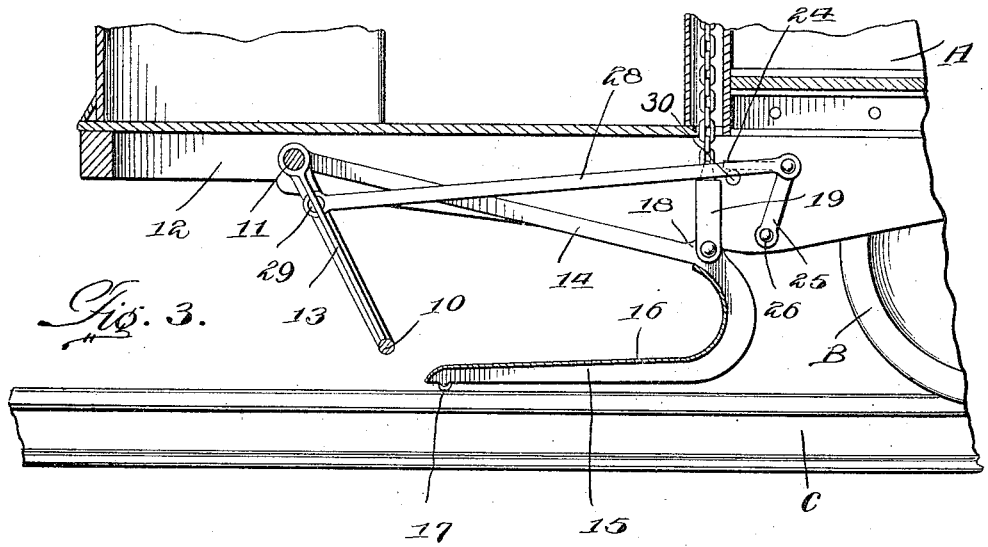
Figure 4:
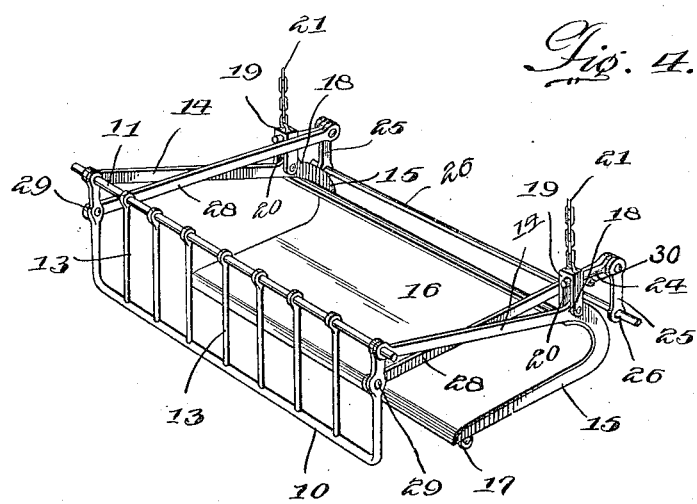
Figure 5:
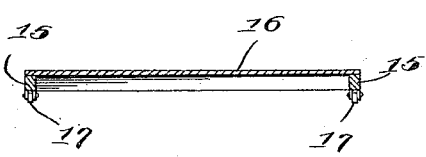

In the drawings:—Figure 1 is a fragmentary side elevation of a street railway car showing the fender constructed in accordance with the invention applied and in normal set position. Fig. 2 is a front elevation thereof. Fig. 3 is a vertical longitudinal sectional view showing the fender dropped. Fig. 4 is a perspective view of the fender when set in normal position. Fig. 5 is a vertical transverse sectional view through the fender proper.

Similar reference characters indicate corresponding parts throughout the several views in the drawings.

Referring to the drawings in detail, A designates a portion of a car body, which is of the street railway type, B the traction wheels, and C the rails of the track over which the wheels travel, the same being of the ordinary well-known construction. Arranged below each end platform of the car body A is a fender, which will be hereinafter fully described. The fender comprises a front guard frame 10, preferably of substantially U-shape, and has its limbs journaled upon a shaft 11 which is journaled in the side sills 12 of the car body below the flooring thereof. This frame 10 at intervals is formed with intermediate bars 13 which are integral with the horizontal portion of the frame and are loosely engaged with the shaft 11.

Journaled upon the shaft 11 and extended rearwardly thereof are levers or arms 14 having downwardly curved forwardly extended portions 15 forming supports for a scoop-like fender body 16 which is disposed spaced rearwardly from the guard frame 10 and is preferably made from sheet metal riveted or otherwise secured to the extensions 15 of the levers or arms 14, the extensions 15 being fitted with friction rollers 17 which are adapted to contact with the balls of the rails C of the track when the fender body 16 has been lowered in a manner presently described. The levers or arms 14 are formed with ears 18 to which are pivotally connected keepers 19 having bifurcations 20, and to the upper ends of these keepers 19 are connected chains 21 which are adapted to be wound upon a windlass 22 suitably fitted in the car body A near the roof thereof, the windlass being rotated in any suitable manner when it is desired to wind the chains 20 thereon for the lifting of the fender body 16 after it has been dropped in a manner presently described.

The keepers 19 have their bifurcations 20 detachably engaged by locking bolts 24 pivotally connected to rocking links 25, the same being pivoted at 26 to the sills of the car body beneath the flooring therein. To the pivots connecting the locking bolts 24 with the links 25 are connected levers 28, the same being also connected by means of pivots 29 to the side limbs of the frame 10, so that on the swinging of the latter, in one direction, the arms 28 will rock the links 25, thereby releasing the locking bolts 24 from the bolts 19, and by the weight of the arms or levers 14 and the fender body 16 the same will drop or gravitate to lowered position, so that the rollers 17 will contact with the balls or treads of the rails C, and the fender body 16, being in this position, will receive any obstruction in the path of advancement of the car. It will be apparent that when the obstruction strikes the frame 10 it will swing the said frame rearwardly, thus unlocking the fender from normal raised position, thereby automatically operating the fender so that the body 16 will become lowered to receive the obstruction and prevent the car passing over the same.

Mounted in the side sills of the car in a position for guiding the locking bolts 24 are guide pins 30 to prevent the locking bolts 24 from dropping during the movements thereof for engagement with the keepers or for releasing the same.

When it is desired to reset the fender after being dropped, it is only necessary to wind the chains 21 on the windlass 22, which may be manually rotated, and thereafter swinging the frame 10 forwardly, which causes the bolts 24 to lock in the keepers 19, thus holding the fender in normal raised or set position.

From the foregoing it is thought that the construction and manner of operation of the device will be clearly understood, and therefore a more extended explanation has been omitted.

What is claimed is:—

1. A car fender comprising a swinging guard, a fender body arranged rearwardly thereof, arms attached to said body, a shaft swingingly supporting the said guard, and arms and adapted to be journaled in the side sills of a car body below its floor, ears formed on the said arms, bifurcated keepers pivotally connected to said ears, flexible members connected with the keepers, a windlass on which is adapted to be wound and unwound the said flexible members, and locking bolts engageable with the keepers to hold the fender body raised, and having connection with the guard for the automatic releasing thereof on the swinging of the guard in one direction.

2. A car fender comprising a swinging guard, a fender body arranged rearwardly thereof, arms attached to said body, a shaft swingingly supporting the said guard and arms and adapted to be journaled in the side sills of a car body below its floor, ears formed on the said arms, bifurcated keepers pivotally connected to said ears, flexible members connected with the keepers, a windlass on which is adapted to be wound and unwound the said flexible members, locking bolts engageable with the keepers to hold the fender body raised, and having connection with the guard for the automatic releasing thereof on the swinging of the guard in one direction, and rollers carried by the fender body and adapted to contact with the rails of a track when the body has been lowered.

In testimony whereof I affix my signature in presence of two witnesses.

JOHN B. COLVIN.

Witnesses:
TURNER WILLIAMS,
LONNIE C. SHANNON.

Copies of this patent may be obtained for five cents each, by addressing the "Commissioner of Patents, Washington, D. C."